US012681481B2

(12) United States Patent
Casbeer et al.

(10) Patent No.: US 12,681,481 B2
(45) Date of Patent: Jul. 14, 2026

(54) METHOD OF AERIAL VEHICLE TRAJECTORY PLANNING

(71) Applicant: Government of the United States, as represented by the Secretary of the Air Force, Wright-Patterson AFB, OH (US)

(72) Inventors: David Casbeer, Xenia, OH (US); Satyanarayana Manyam, Beavercreek, OH (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 114 days.

(21) Appl. No.: 18/225,122

(22) Filed: Jul. 22, 2023

(65) Prior Publication Data

US 2024/0061448 A1      Feb. 22, 2024

Related U.S. Application Data

(60) Provisional application No. 63/398,653, filed on Aug. 17, 2022.

(51) Int. Cl.
*G05D 1/00*        (2024.01)
*B64U 10/25*       (2023.01)
(Continued)

(52) U.S. Cl.
CPC ............. *G05D 1/106* (2019.05); *B64U 10/25* (2023.01); *G01C 21/20* (2013.01); *G08G 5/21* (2025.01);
(Continued)

(58) Field of Classification Search
None
See application file for complete search history.

(56) References Cited

U.S. PATENT DOCUMENTS

| | | | |
|---|---|---|---|
| 9,821,801 B2 | 11/2017 | Di Cairano et al. | |
| 10,146,224 B2 | 12/2018 | Tafti et al. | |
| (Continued) | | | |

FOREIGN PATENT DOCUMENTS

| | | | |
|---|---|---|---|
| CN | 114137991 A | * | 3/2002 |

OTHER PUBLICATIONS

Machine translation of Han et al. (CN-114137991-A) (Year: 2022).*
(Continued)

*Primary Examiner* — Navid Z. Mehdizadeh
*Assistant Examiner* — Sarah A. Mueller
(74) *Attorney, Agent, or Firm* — AFMCLO/JAZ; Jeffrey V. Bamber

(57) ABSTRACT

Methods of aerial vehicle trajectory planning are provided. The method is used where the aerial vehicle is in an area with one or more obstacles therein and the aerial vehicle has a minimum turn radius. The methods involve finding safe flight corridors, which are constructed from sequences of triangles using constrained Delaunay triangulation of the feasible space. A quadratic Bézier curve corresponding to each triangle in the flight corridor is defined. The trajectory is composed of quadratic Bézier curves that are aligned end-to-end which satisfy the vehicle motion constraints. The method described herein may also be used for path planning.

10 Claims, 7 Drawing Sheets
(2 of 7 Drawing Sheet(s) Filed in Color)

(51) Int. Cl.

| | |
|---|---|
| *G01C 21/20* | (2006.01) |
| *G08G 5/21* | (2025.01) |
| *G08G 5/32* | (2025.01) |
| *G08G 5/55* | (2025.01) |
| *G08G 5/57* | (2025.01) |

(52) U.S. Cl.
CPC ................ *G08G 5/32* (2025.01); *G08G 5/55* (2025.01); *G08G 5/57* (2025.01); *B64U 2201/10* (2023.01)

(56) References Cited

U.S. PATENT DOCUMENTS

| | | | | |
|---|---|---|---|---|
| 10,427,676 | B2 | 10/2019 | Tafti et al. | |
| 2018/0059670 | A1 | 3/2018 | Nilsson | |
| 2021/0150917 | A1* | 5/2021 | Kubie | ................... G05D 1/689 |
| 2022/0270495 | A1* | 8/2022 | Pele | ........................ G08G 5/30 |
| 2023/0038647 | A1* | 2/2023 | Agarwal | ................... G06T 1/20 |

OTHER PUBLICATIONS

Shanmugavel, Madhavan, et al., "Collision avoidance and path planning of multiple UAVs using flyable paths in 3D", Sep. 27, 2010, IEEE (Year: 2010).*

Dubins, "On Curves of Minimal Length with a Constraint on Average Curvature, and with Prescribed Initial and erminal Positions and Tangents," American Journal of Mathematics, vol. 79, No. 3, p. 497, Jul. 1957.

X.-N. Bui, et al., "Shortest path synthesis for dubins nonholonomic robot," in IEEE International Conference on Robotics and Automation (ICRA), 1994, pp. 2-7.

S. Karaman, et al., "Anytime motion planning using the RRT," in IEEE International Conference on Robotics and Automation, 2011, pp. 1478-1483.

J. L. Blanco, et al., "TP-spaceRRT-kinematic path planning of non-holonomic any-shape vehicles," International Journal of Advanced Robotic Systems, vol. 12, No. 5, p. 55, 2015.

D. Ghosh, el al., "Kinematic constraints based Bi-directional RRT (KB-RRT) with parameterized trajectories for robot path planning in cluttered environment," in IEEE International Conference on Robotics and Automation (ICRA), 2019, pp. 8627-8633.

D. Dolgov, et al., "Path planning for autonomous vehicles in unknown semi-structured environments," The International Journal of Robotics Research, vol. 29, No. 5, pp. 485-501, 2010.

S. G. Manyam, D. Casbeer, A. Von Moll, and Z. Fuchs, "Optimal Dubins paths to intercept a moving target on a circle," in American Control Conference (ACC), 2019, pp. 828-834.

S. G. Manyam, S. Rathinam, D. Casbeer, and E. Garcia, "Tightly Bounding the Shortest Dubins Paths Through a Sequence of Points," Journal of Intelligent and Robotic Systems: Theory and Applications, vol. 88, No. 2-4, pp. 495-511, 2017.

C. Chen, Y. He, C. Bu, J. Han, and X. Zhang, "Quartic B'ezierCurve Based Trajectory Generation for Autonomous Vehicles withCurvature and Velocity Constraints," in IEEE International Conference on Robotics and Automation (ICRA), 2014, pp. 6108-6113.

J. Chen, T. Liu, and S. Shen, "Online generation of collision-free trajectories for quadrotor flight in unknown cluttered environments," in IEEE International Conference on Robotics and Automation (ICRA), 2016, pp. 1476-1483.

Y. Chen, Y. Cai, J. Zheng, and D. Thalmann, "Accurate and Efficient Approximation of Clothoids using B'ezier Curves for Path Planning," IEEE Transactions on Robotics, vol. 33, No. 5, pp. 1242-1247, 2017.

F. Gao, W. Wu, Y. Lin, and S. Shen, "Online safe trajectory generation for quadrotors using fast marching method and Bernstein basis polynomial," in IEEE International Conference on Robotics and Automation (ICRA), 2018, pp. 344-351.

S. Liu, M. Watterson, K. Mohta, K. Sun, S. Bhattacharya, C. J. Taylor, and V. Kumar, "Planning dynamically feasible trajectories for quadrotors using safe flight corridors in 3-d complex environments," IEEE Robotics and Automation Letters, vol. 2, No. 3, pp. 1688-1695, 2017.

M. Kallmann, "Shortest Paths with Arbitrary Clearance from Navigation Meshes," in Proceedings of the 2010A MSIG-GRAPH/ Eurographics Symposium on Computer Animation, Madrid, Spain, Jul., pp. 159-168.

J. R. Shewchuck, "Delaunay Refinement Algorithms for Triangular Mesh Generation", Computational Geometry, vol. 22, No. 1-3, pp. 21-74, 2002.

S. G. Johnson, "The nlopt nonlinear-optimization package," website URL http://github.com/stevengj/nlopt, available on the internet before the priority date of the present application.

J. Revels, M. Lubin, and T. Papamarkou, "Forward-mode automatic differentiation in Julia," arXiv:1607.07892 [cs.MS], 2016. [Online]. Available at: https://arxiv.org/abs/1607.07892.

J. Bezanson, A. Edelman, S. Karpinski, and V. B. Shah, "Julia: A fresh approach to numerical computing," SIAM Review, vol. 59, No. 1, pp. 65-98, 2017.

S. Rasmussen, D. Kingston, and L. Humphrey, "A Brief Introduction to Unmanned Systems Autonomy Services (UxAS)," in International Conference on Unmanned Aircraft Systems (ICUAS), 2018.

Authors Unknown, "OpenUxAS", Air Force Research Laboratory, Aerospace Systems Directorate, available online: https://github.com/afrl-rq/OpenUxAS before the priority date of the present application.

D. Nelson, D. Barber, T. McLain, and R. Beard, "Vector Field Path Following for Miniature Air Vehicles," IEEE Transactions on Robotics, vol. 23, No. 3, pp. 519-529, Jun. 2007.

R. Beard, et al., Small Unmanned Aircraft: Theory and Practice, Chapter 10, Princeton University Press, 2012.

Weintraub, et al., Circular Rejoin in 3D Using B'ezier Paths, 2020 IEEE Conference on Control Technology and Applications (CCTA), Aug. 24-26, 2020. Montréal, Canada.

Manyam, et al., Quadratic Bezier Curves for Multi-Agent Coordinated Arrival in the Presence of Obstacles, AIAA Scitech 2021 Forum, 11-15 & Jan. 19-21, 2021, Virtual Event.

Choe, R., Cooperative Trajectory Generation Using Pythagorean Hodograph Bézier Curves, Journal of Guidance, Control, and Dynamics, vol. 39, No. 8, Aug. 2016.

Satyanarayana G. Manyam, et al., Trajectory Optimization for Rendezvous Planning Using Quadratic B'ezier Curves, 2021 IEEE/RSJ International Conference on Intelligent Robots and Systems (IROS), Sep. 27-Oct. 1, 2021, Prague, Czech Republic.

W. Sun, G. Tang, and K. Hauser, "Fast UAV trajectory optimization using bilevel optimization with analytical gradients," in American Control Conference (ACC), 2020, pp. 82-87.

H. Deddi, et al., "Interpolation with Curvature Constraints," INRIA Lorraine, Viller-Les-Nancy, France, Research Report RR-4064, 2006, available at htpps://hal.inria.fr/inria-00072572.

\* cited by examiner

METHOD OF AERIAL VEHICLE TRAJECTORY PLANNING

Pursuant to 37 C.F.R. § 1.78(a)(4), this application claims the benefit of and priority to prior filed Provisional Application Ser. No. 63/398,653, filed Aug. 17, 2022, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

The present invention relates generally to aerial vehicles and, more particularly, to methods of aerial vehicle trajectory planning. The method described herein may also be used for path planning.

BACKGROUND OF THE INVENTION

Various attempts have been made to plan for the trajectory of aerial vehicles, including unmanned aerial vehicles. Some current methods used for planning the trajectory of aerial vehicles are limited to performing shortest path calculations. Such methods often do not account for the time of arrival. Such methods also often do not include the path length while planning the trajectory for the aerial vehicle, but instead calculate the trajectory length after computing the trajectory. Further, such methods also do not readily handle the presence of obstacles in the area in which the aerial vehicle will be traveling. Other methods use complex Bézier curves with four or more control points. Such methods are computationally expensive, rendering those methods impractical for placing on-board the aerial vehicle.

Therefore, a need exists for improved methods of aerial vehicle trajectory planning. In particular, a need exists for methods of aerial vehicle trajectory planning that are capable of calculating the length of the path, as well as the time of arrival. A need also exists for methods of planning the trajectory of aerial vehicles in an area that contains obstacles. A need exists for methods that are capable of planning trajectories for not only aircraft that can hover, but also for fixed wing aircraft. A need also exists for computational methods that are computationally simple and fast enough to provide on-board real-time computation for an aerial vehicle.

SUMMARY OF THE INVENTION

The present invention relates generally to aerial vehicles and, more particularly, to methods of aerial vehicle trajectory planning. The method described herein may also be used for path planning.

While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention, a method of planning a trajectory of an aerial vehicle from a start location to an end location is provided. The method is used where the aerial vehicle is in an area which has one or more obstacles therein and the aerial vehicle has a minimum turn radius. In the case of a rendezvous with another aerial vehicle, the time of travel of both aerial vehicles to the rendezvous point is the same. This is the rendezvous constraint. The method comprises the steps of:

(a) generating a safe corridor to account for obstacles in the area in which the aerial vehicle will be traveling, the step of generating a safe corridor comprising representing the flight corridor as a series of triangles, wherein obstacles are defined as holes in the area between the triangles;

(b) defining a quadratic Bézier curve corresponding to each triangle in the flight corridor, wherein each quadratic Bézier curve has a pair of ends and a plurality of control points, wherein the control points include an initial control point and a terminal control point, and bounding each quadratic Bézier curve to lie within the corresponding triangle, wherein the quadratic Bézier curves include an initial Bézier curve and a final Bézier curve, and wherein the radius of curvature along all portions of the quadratic Bézier curves is greater than or equal to the minimum turn radius of the aerial vehicle;

(c) constraining the terminal control point on the final Bézier curve to align with the end location;

(d) aligning the quadratic Bézier curves end-to-end to form a trajectory comprising a path having a length that satisfies the rendezvous constraint and wherein the tangent to the path is continuous along the length of the path; and (e) utilizing a nonlinear program to simultaneously solve for the control points of all of the quadratic Bézier curves.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate embodiments of the present invention and, together with a general description of the invention given above, and the detailed description of the embodiments given below, serve to explain the principles of the present invention.

3                                              4

Figure 5A:
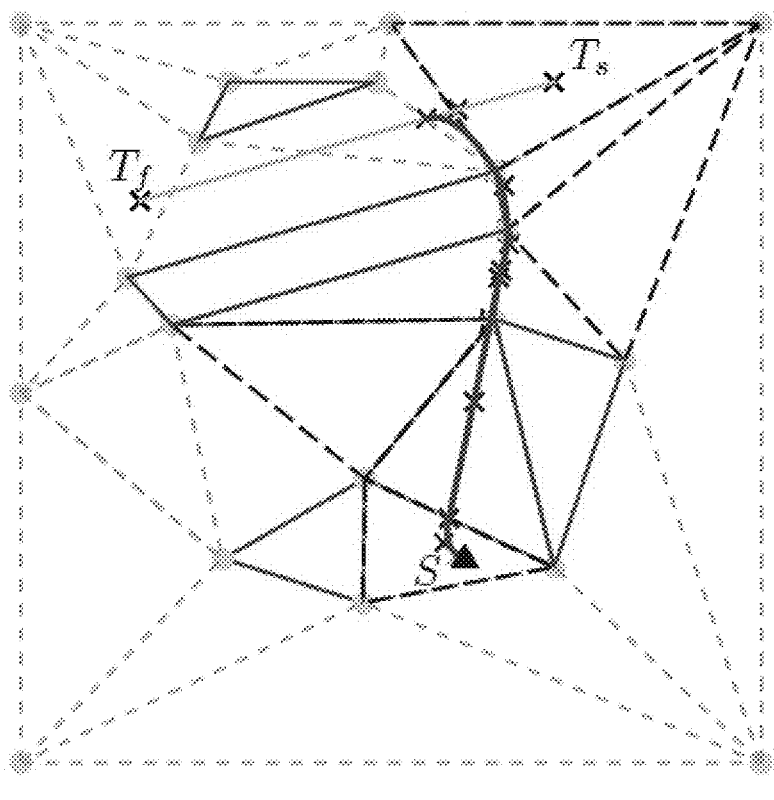

FIG. 5A is a diagram showing a rendezvous path for a first value of an arrival time $t_s$.

Figure 5B:
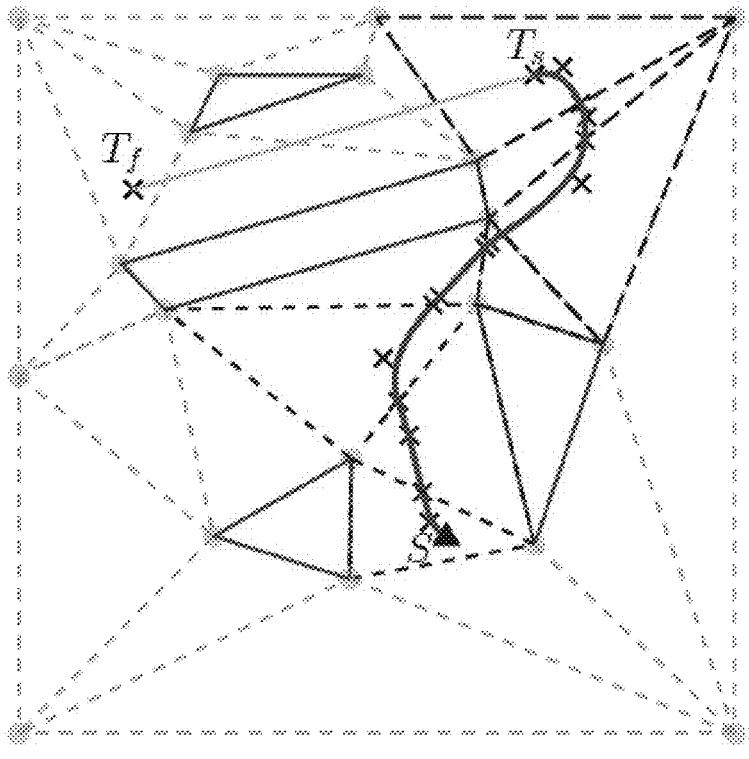

FIG. 5B is a diagram showing a rendezvous path for a second value of an arrival time $t_s$.

Figure 5C:
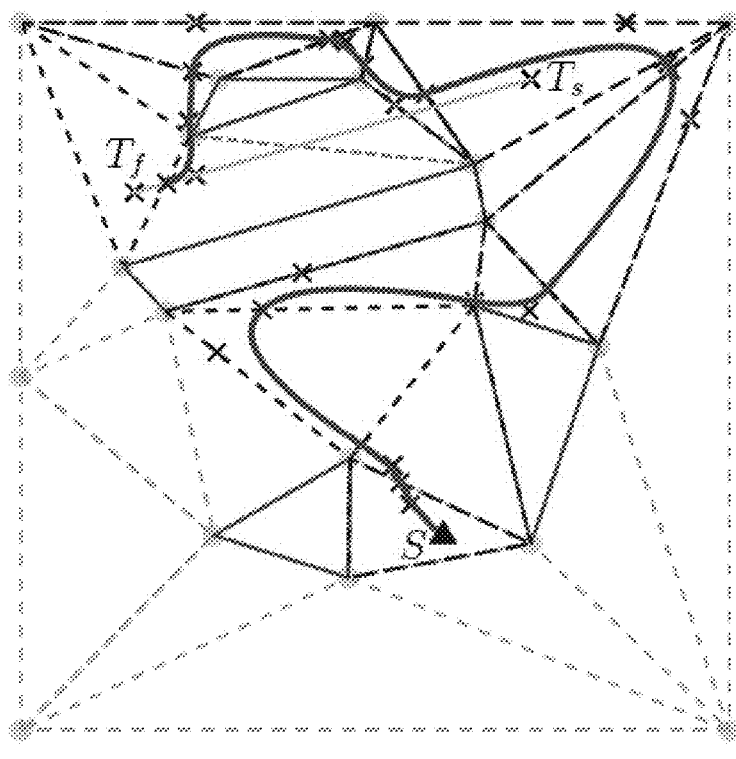

FIG. 5C is a diagram showing a rendezvous path for a third value of an arrival time $t_s$.

Figure 5D:
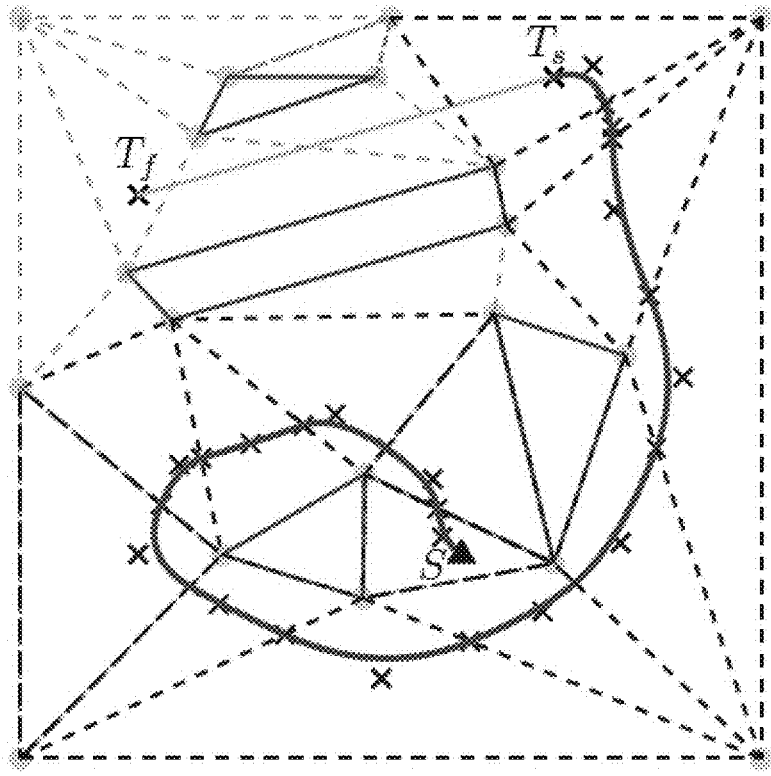

FIG. 5D is a diagram showing a rendezvous path for a fourth value of an arrival time $t_s$.

Figure 6:
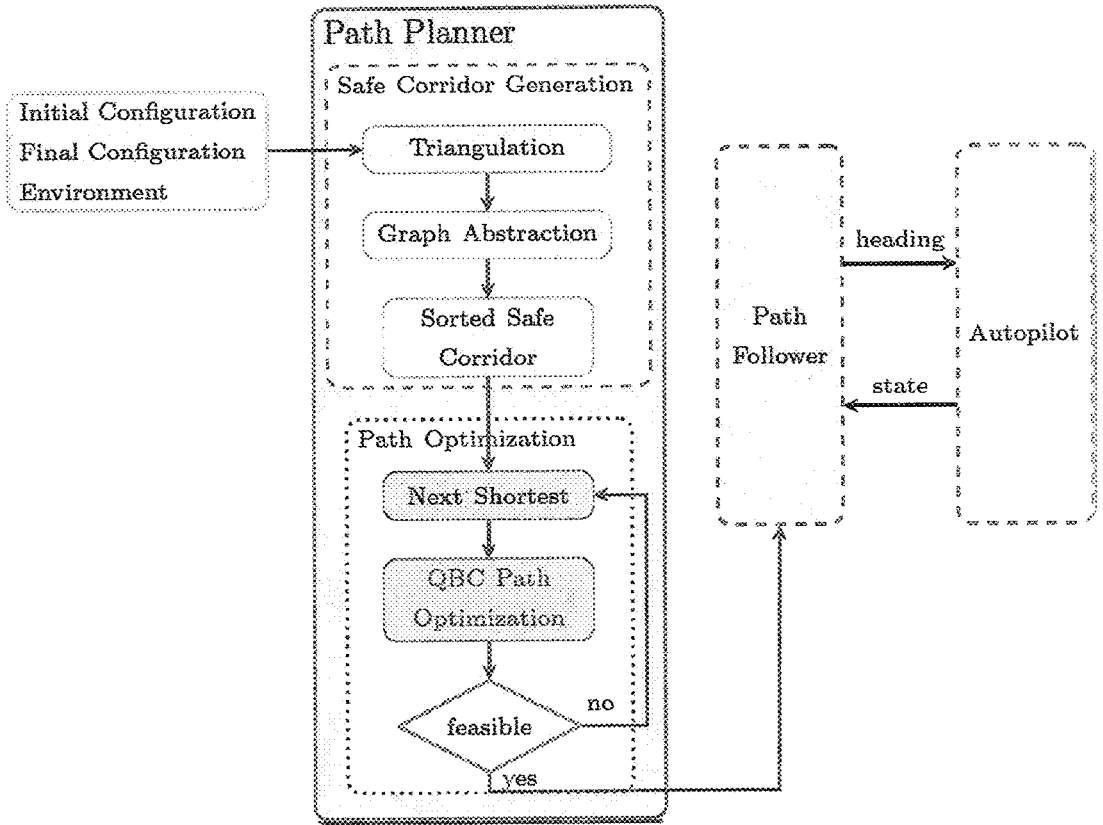

FIG. 6 is a flow chart of the flight test implementation.

Figure 7A:
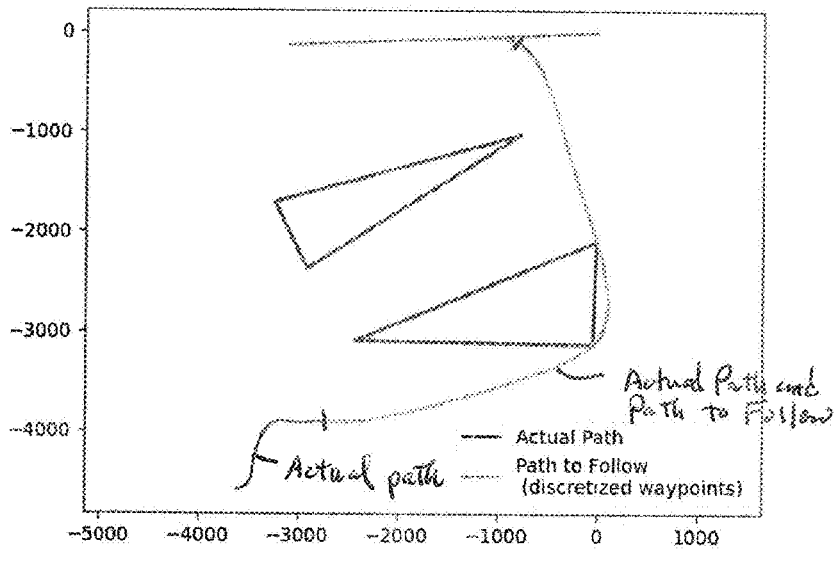

FIG. 7A is a graph showing a flight test result.

Figure 7B:
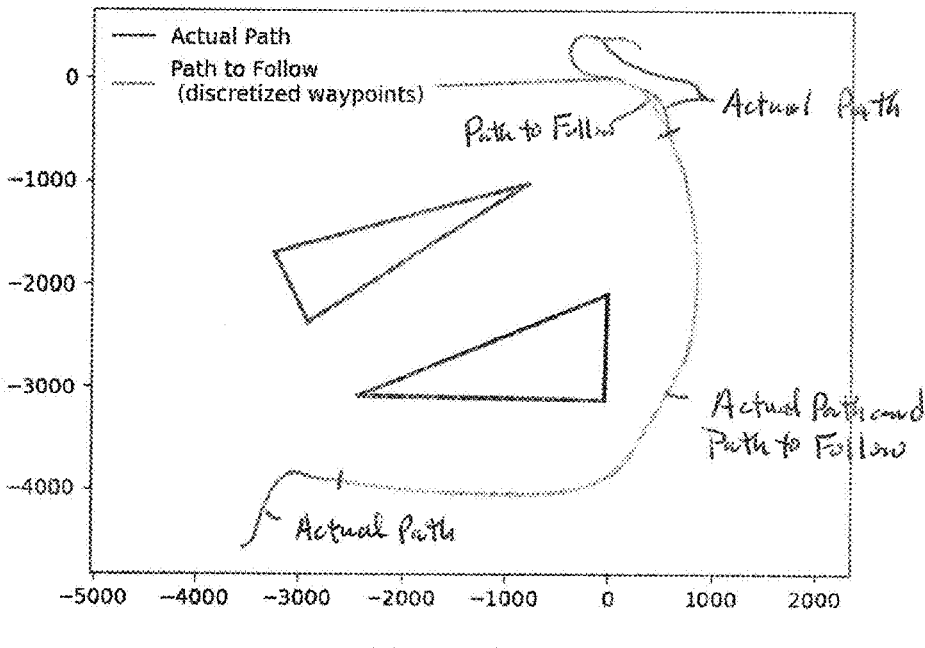

FIG. 7B is a graph showing another flight test result.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity of illustration.

DETAILED DESCRIPTION OF THE INVENTION

The present invention relates generally to aerial vehicles and, more particularly, to methods of aerial vehicle trajectory planning. The method described herein may also be used for path planning.

The methods described herein can be used in any situation in which aerial vehicle trajectory planning is needed including, but not limited to, planning trajectories for: manned aircraft, unmanned aerial vehicles such as drones, air taxis, and urban air mobility. The aircraft include aircraft that can hover (e.g., rotary wing aircraft), as well as fixed wing aircraft. The methods, however, are particularly useful for fixed wing aircraft since such aircraft have curvature, or turning, limitations. Aircraft that can hover and stop are not subject to curvature limitations. However, in the case of aircraft that can hover, if the mode of operation requires that the aircraft not stop when the aircraft turns, it is subject to these turn/curvature constraints. The methods can be used to determine single vehicle time of arrival; and multi-vehicle rendezvous, intercept, simultaneous arrival and sequential arrival scenarios.

Definitions

As used herein, an element or step recited in the singular and preceded with the word "a" or "an" should be understood as including the plural of such elements or steps, unless the plural of such elements or steps is specifically excluded.

The term "agent" may be used as an alternative to the term "vehicle".

Bézier curves are parametric curves named after a French engineer, Pierre Bézier, that are used in computer graphics and related fields. Bézier curves are splines that are defined by polynomials over a finite interval in the Bernstein basis. A set of discrete control points define a smooth, continuous curve using a formula.

A quadratic Bézier curve (QBC) is a curve created using three control points.

The term "configuration", as used herein, with reference to the initial and final portions of a trajectory, refers to a position and orientation.

The term "curvature", as used herein, refers to how much the trajectory "bends." Maximum curvature is equivalent to minimum turn radius of an aerial vehicle or minimum radius of curvature. If the trajectory bends more, then the path is turning on a tighter/smaller turn circle.

Delaunay triangulation is used in mathematics and computational geometry. A Delaunay triangulation (DT) is a triangulation for a given set P of discrete points such that no point is inside the circumcircle of any triangle in DT(P). Delaunay triangulations maximize the minimum angle of all of the angles in the triangles of the triangulation, and tend to avoid sliver triangles.

The term "feasible", as used herein with respect to a trajectory means that the generated trajectory: 1) satisfies kinematic constraints (e.g., maximum curvature, that is minimum turn radius): 2) is of a specified length; and 3) avoids obstacles.

The term "G1 continuous" refers to a curve where the tangent is continuous at all points along the curve.

The "kinematic constraints" of an aerial vehicle refers to the vehicle's minimum turn radius. Kinematic constraints fall under the category of non-holonomic constraints, and hence the vehicle/agent subject to kinematic constraints may be referred to as a non-holonomic agent/vehicle.

The term "non-holonomic", as used herein, refers to a vehicle that satisfies the kinematic constraints.

The term "path", as used herein, refers to a spatial collection of points to move from one location to another.

The term "rendezvous", as used herein, refers to two vehicles arriving at a location at the same time with the same heading. The two vehicles may be flying at the same or different altitudes. In practice the two vehicles may not be in exactly the same location. In an application such as aerial refueling, the two vehicles would be at different altitudes, and their positions could be very close within a certain tolerance. This could be considered as occupying the same position when posing it as a mathematical problem. In addition, such planning could be used for a "collision course." However, the end-part, when the intercepting agent gets close, it would need to switch to a feedback control policy, as the a priori planning would most likely not be sufficient due to uncertainty in the system. In other words, the planner would get the vehicle close enough for collision, where another controller would take over for terminal guidance.

The phrase "solve for control points", as used herein, means to find the control points such that the Bezier curves defined by these control points satisfies the constraints on length, curvature etc., and minimizes a defined cost.

A "trajectory" comprises a (spatial) path and time (or speed) requirements associated with each point (schedule) while traveling along the path. Thus, a trajectory is a special case of a path, but a path is not a trajectory.

General Approach

The methods described herein plan trajectory of aerial vehicles by specifically incorporating the length of the path into the computations. For a specific constant speed, the length is equivalent to the time of travel multiplied by speed (since speed=length/time).

The methods described herein use quadratic Bézier curves (QBCs) to generate feasible trajectories. Quadratic Bézier curves are particularly suitable for generating trajectories since there is a closed form solution for the maximum curvature and length of a QBC.

The methods described herein generate feasible corridors as sequences of triangles so that a QBC can be assigned to each triangle. Concatenating multiple QBCs (that is, linking multiple QBCs in series) and carefully defining constraints on the control points between two adjoining QBCs provide the ability to compute in closed form the maximum curvature and length. Doing so allows one to establish the feasibility and objective as functions of control points. The method allows for faster computation because the constraints are expressed in closed form and because the constraints on the problem are defined in the space of control points, which is lower dimensional and thus improves computational efficiency.

To generate a safe flight corridor to deal with obstacle avoidance, constrained Delaunay triangulation (CDT) is used. The methods described herein, thus, generate a flight corridor as a series of triangles, defining a QBC corresponding to each triangle in the flight corridor, and the obstacle avoidance is addressed by bounding each QBC to lie in the corresponding triangle. Each QBC is a function of its control points, and the nonlinear program (that is, the optimization problem) minimizes a cost function by simultaneously solving for the control points of all the QBCs. The constraints of this optimization problem satisfy the path continuity, maximum curvature and the constraints on the path length using these control points.

Figure 1:
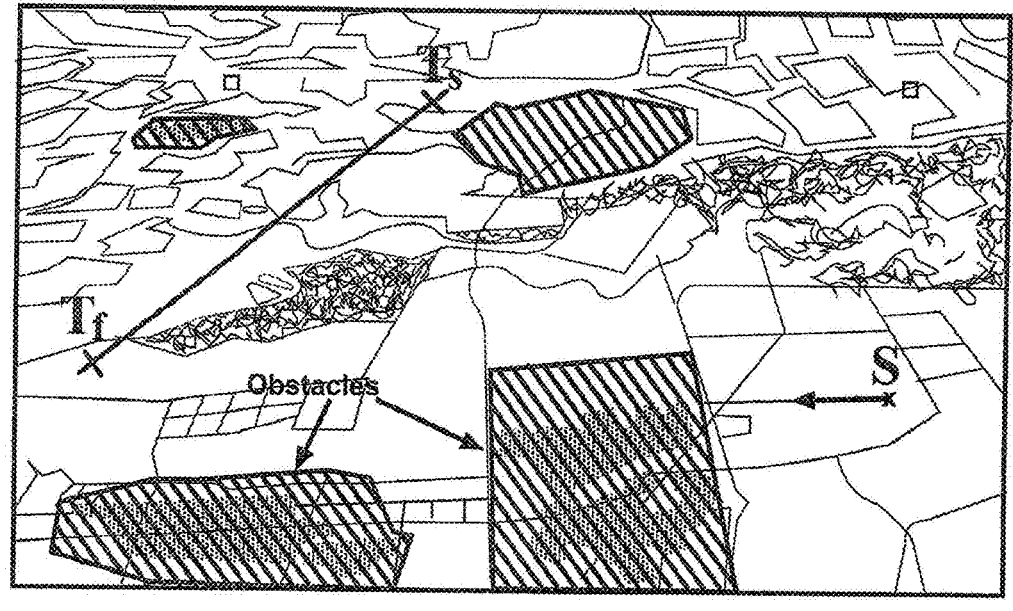
FIG. 1 is a perspective aerial photograph of the space in which an aerial vehicle will travel in an example problem scenario.

FIG. 1 shows the space in which an aerial vehicle will travel in an example problem scenario. The obstacles in the environment are known apriori and can be reasonably modeled by polygons. The initial configuration of the autonomous air-vehicle ($AV_1$) is given $S=(s_x,s_y,s_\theta)$, where $(s_x,s_y)$ are the position coordinates, and $s_\theta$ is the heading measured with respect to a predefined x-axis. The methods described herein can accommodate several different variations of the problem scenarios. In some cases, the methods can be used to plan a trajectory for a first air vehicle that travels to a fixed end point. In another variation, the air-vehicle $AV_1$ is required to rendezvous in some predefined "feasible space" with a second, moving air-vehicle $AV_2$. The feasible space is a line segment that does not intersect with any of the obstacles. In the second variation, $T_s$ and $T_f$ represent the ends of this line segment. The second moving air-vehicle $AV_2$ starts at $T_s$ and travels at constant speed and heading towards the $T_f$, with a heading direction $t_\theta$. The time of arrival of the $AV_2$ at $T_s$ is $t_s$. In the first variation (the first air vehicle traveling to a fixed end point), the object that would be the second air-vehicle $AV_2$ in the second scenario can be assigned a speed of zero. The autonomous air-vehicle, $AV_1$, has kinematic constraints, and for the trajectory generated to be flyable, the curvature at any point on the path must be less than the maximum curvature limit, $\kappa_{limit}$.

The path planning problem is to find the rendezvous point, $R_t$, on the line segment $T_sT_f$ and the path of minimum length that satisfies the following: (i) the path starts at $(s_x,s_y)$ with heading so and ends at $R_t$ with a heading $t_\theta$; (ii) $AV_1$ and $AV_2$ arrive at $R_t$ simultaneously; (iii) the maximum curvature of the path is less than $\kappa_{limit}$; and (iv) the path is feasible with respect to the obstacles.

Bézier curves are splines that are defined by polynomials over a finite interval in the Bernstein basis. The maximum degree of the polynomials is referred to as the degree of the Bézier curve. Let $P(\tau)$ be a Bézier curve of degree n, and it is given as:

$$P(\tau) = \sum_{k=0}^{n} p_k b_k^n(\tau) \tag{1}$$

where $\tau \in [0, 1]$ is a non-dimensional parameter, and $p_0$, $p_1$, ... $p_n \in R^2$ are the control points, and $b_k^n(\tau)$ are the Bernstein polynomials of degree n. The symbol E represents set membership and reads "is an element or member of" or "belongs to".

Figure 2:
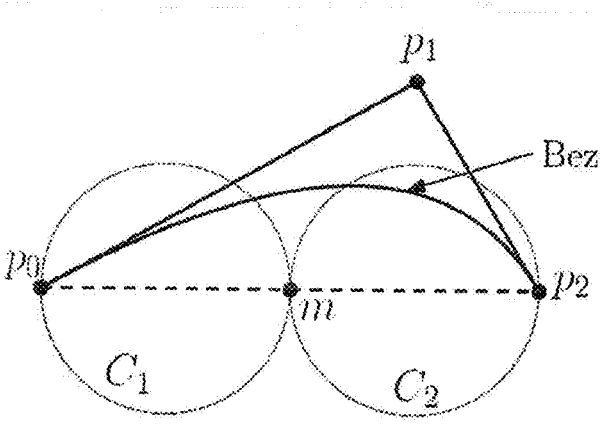
FIG. 2 is a diagram showing a quadratic Bézier curve with its control points.

FIG. 2 shows an example of a quadratic Bézier curve with its control points. Bézier curves have the following properties which makes them well suited for path planning: (i) a Bézier curve always starts at the first control point and ends at the final control point; (ii) the tangent of the curve at these end points aligns with the line passing through the two end control points; (iii) the Bézier curve always lies inside the convex hull of the control points. In geometry, the convex hull of a shape is the smallest convex set that contains it. In the present case, the convex hull can be thought of a shape similar to that of a rubber band that contains all of the control points. This property makes them adaptable for path planning in the presence of obstacles, where one can appropriately constrain the control points such that the associated convex hull does not intersect with the obstacles, and construct a feasible path.

The maximum curvature of paths are required to be less than a limit, $\kappa_{limit}$, which corresponds to the minimum turn radius of the vehicles. For a QBC, there exists a closed form solution for the maximum curvature and the length of the path. Therefore, QBCs are used for path planning in order to address the curvature constraints and the temporal constraints (manifested as a length constraint).

In FIG. 2, $p_0, p_1, p_2$ are the control points of a QBC, $P(\tau)$. The mid-point of the line joining $p_0$ and $p_2$ is represented by m. $A_t$ is the area of the triangle $\Delta p_0, p_1, p_2$. In FIG. 2, $C_1$ and $C_2$ are circles with diameters $p_0m$ and $p_2m$ respectively. The closed form solution of the maximum curvature, $\kappa_{max}$, of a QBC as a function of the control points depends on the position of $p_1$ as shown below:

$$\kappa_{max} = \begin{cases} \dfrac{\|p_1m\|^3}{A_t^2}, & \text{if } p_1 \notin C_1 \cup C_2, \\[2ex] \dfrac{A_t}{\|p_0p_1\|^3}, & \text{if } p_1 \in C_1, \\[2ex] \dfrac{A_t}{\|p_1p_2\|^3}, & \text{if } p_1 \in C_2. \end{cases} \tag{2}$$

where the symbol $\notin$ indicates no set membership and reads "is not an element or member of" or "does not belong to."

The length of a QBC can be expressed as an analytical function of its control points, and is given below.

$$L_b = \frac{1}{8A^{\frac{3}{2}}}\left[ 4A^{\frac{3}{2}}W + \right.$$

$$\left. 2\sqrt{A}\,B\left(W - \sqrt{C}\right) + (4CA - B^2)\log\left\|\frac{2\sqrt{A} + \dfrac{B}{\sqrt{A}} + 2W}{\dfrac{B}{\sqrt{A}} + 2\sqrt{C}}\right\| \right], \tag{3}$$

$$\text{where } W = \sqrt{(A + B + C)}, \; A = 4(a_x^2 + a_y^2),$$

$$B = 4(a_xb_x + a_yb_y), \; C = b_x^2 + b_y^2, \text{ and}$$

$$a = p_0 - 2p_1 + p_2, \; b = 2p_1 - 2p_0.$$

The idea to define the path as a concatenation of QBCs defined by the control points leverages the existence of closed form solutions for the maximum curvature and the length of a QBC. This property allows the current path planning problem to be posed as nonlinear optimization over the control points. To satisfy the obstacle avoidance constraints, the QBCs are guided using safe flight corridors that are defined by a series of adjacent triangles. A QBC is assigned to each triangle and the QBCs belonging to adjacent triangles are constrained to be $G^1$ continuous. In the following section, the corridor generation algorithm is presented using constrained Delaunay triangulation.

FIG. 6 shows the methods/algorithm comprise two main components: 1) safe corridor generation and 2) path optimization. Safe corridor generation can be divided into three main steps: a) triangularization, b) graph abstraction, and c) finding a set of safe corridors.

Safe Corridor Generation

The overall approach of safe corridor construction involves three steps. In the first step, a triangulation of the "feasible-space" is generated using constrained Delaunay triangulation. In the second step, an abstract graph is constructed where each node of the graph represents a triangle, and the nodes corresponding to adjacent triangles are connected by an edge. The third step uses k-shortest path to construct a list of safe corridors representing paths from the initial triangle to the final triangle that are sorted from smallest to longest.

Figure 3A:
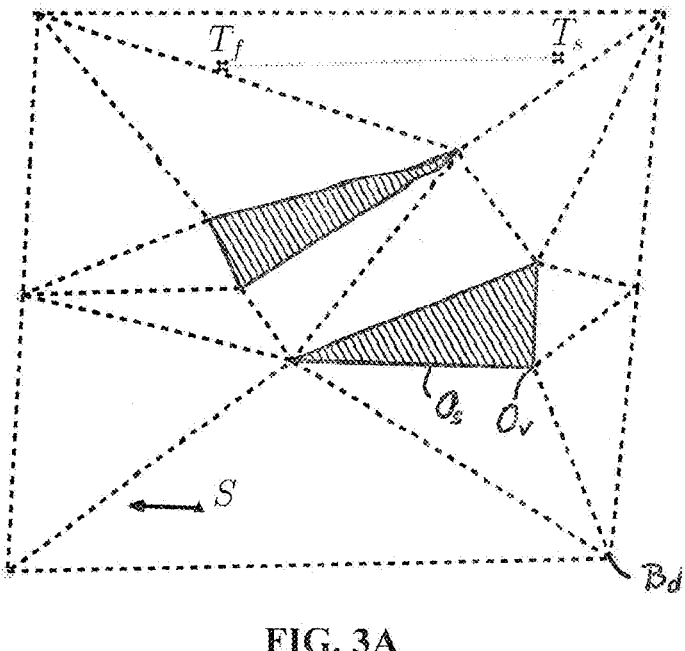
FIG. 3A is a diagram showing an example of a triangulation generated using the Delaunay refinement algorithm.

FIG. 3A shows an example of the first step in the safe corridor generation portion of the methods, triangularization. This is step 3 in Algorithm 1 (below). In the triangularization step obstacles are holes in the triangularization domain. The input into this step is a planar straight line graph (PSLG) which consists of a vertex set describing the external boundary and obstacle vertices, segments defined by pairs of vertices describing edges of obstacles and the boundary, and a set of holes defined by an (x,y) location inside each obstacle. The output of the triangularization is a mesh with the following properties: 1) the union of the mesh is the triangulation domain and 2) the triangles' internal angles are neither too small nor too large.

More specifically, as shown in FIG. 3A, O is the set of polygonal obstacles, and $O_v$ and $O_s$ are the set of vertices and edges of the obstacles, respectively. The Delaunay refinement algorithm is used to generate the triangulation of the feasible space. This technique generates triangulation with some useful properties such as the following. The union of the triangles is the triangulation domain, and any segment is in the union of the triangulation edges. The Delaunay refinement algorithm aims to bound the smallest angle in the triangles. This avoids generating triangles with large or small angles, and it would be apt for the current path planning problem. One can define the obstacles as "holes" in the domain and the Delaunay refinement algorithm avoids generating the triangulation inside the obstacles (which are shown with hatched lines in FIG. 3A). Let $O_h$ denote the set of "holes", where each hole is parameterized by a point inside an obstacle. The inputs to the Delaunay refinement algorithm are a planar straight line graph (PSLG), which is defined using the vertices and edges of the obstacles, and the set of "holes", $O_h$. The vertex set also includes the boundary points, $B_d$, that defines the whole domain. The sequence of triangles is denoted by $S_T$.

Figure 3B:
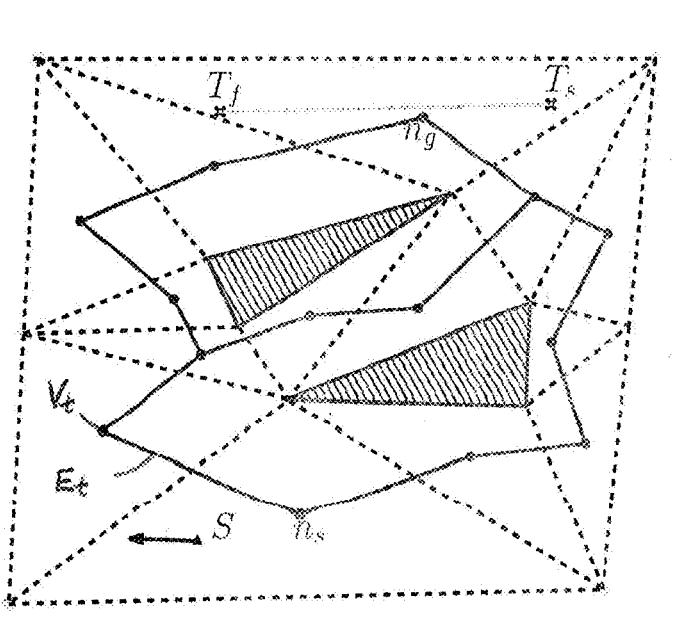
FIG. 3B is a diagram showing an example of an abstract graph based upon the triangulation in FIG. 3A.

FIG. 3B shows an example of the second step in the safe corridor generation portion of the methods, graph abstraction. An abstract graph of the operating domain is constructed. The input in this step is the mesh and the output is a graph. This abstraction is accomplished by creating a node for each triangle and an edge between two nodes if the triangles that they represent share an edge.

More specifically, in the second step, an abstract graph is created based on the triangulation, $S_T$, obtained from the Delaunay refinement. A graph $G_t$ is constructed with vertex set $V_t$ and edge set $E_t$. A node corresponding to every triangle is added to $V_t$, and for every pair of adjacent (those that share an edge) triangles, an edge is added to $E_t$. The construction of the graph is shown in steps 4-13 of Algorithm 1 (below). The nodes corresponding to the triangle that contains S is identified as the start node, $n_s$. The set of nodes that correspond to the triangles that intersect with line segment $T_s T_f$ is identified as the goal node set, $N_g$. For each node $n_g \in N_g$, the paths from $n_s$ to $n_g$ are listed, and these paths are added to the set $S_{paths}$. The set $S_{paths}$ is sorted in ascending order of the path lengths, and for each path in this set a flight corridor is constructed using the triangles corresponding to the sequence of nodes in the path. Algorithm 1 returns the list of the feasible corridors in ascending order of corresponding path lengths in $G_t$.

---

Algorithm 1 Corridor construction for the path planning

```
1: function SAFECORRIDORS(O_v, O_s, O_h, B_d)
2:     O_v ← O_v ∪ B_d
3:     S_T ← DELAUNAYREFINEMENT(O_v, O_s, O_h)
4:     V_t, E_t ← { }
5:     for Δ_u ∈ S_T do
6:         S_adj ← GETADJACENTTRIANGLES(Δ_u)
7:         if NODE(Δ_u) ∉ V_t then
8:             V_t ← V_t ∪ CREATENODE(Δ_u)
9:         for Δ_u ∈ S_adj do
10:            if NODE(Δ_v) ∉ V_t then
11:                V_t ← V_t ∪ CREATENODE(Δ_v)
12:            if (Δ_u, Δ_v) ∉ E_t then
13:                E_t ← E_t ∪ CREATEEDGE(Δ_v)      ▷ the
           weight of the edges are set to the distance between centroids of the
           triangles
14:        G_t ← CREATEGRAPH(V_t, E_t)
15:        n_s ← GETSTARTNODE( )
16:        N_g ← GETGOALNODESET( )
17:        S_paths ← { }
18:        for n_g ∈ N_g do
19:            S_paths ← S_paths ∪ ALLTPATHS(G_t, n_s, n_g)
20:        S_paths ← SORT (S_paths)
21:        S_corrs ← { }
22:        for s_p ∈ S_paths do
23:            S_corrs ← S_corrs ∪ GETCORRIDOR(s_p)
24:        return S_corrs
```

---

Figure 3C:
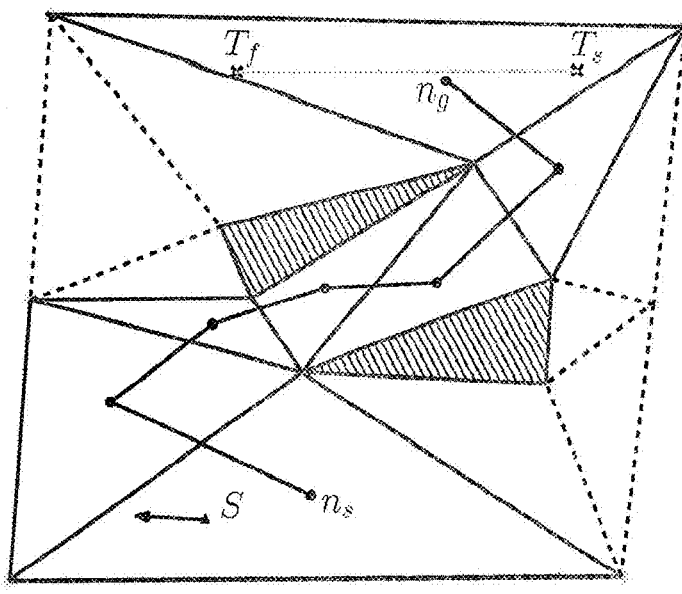
FIG. 3C is a diagram showing an example of a corridor constructed based on the shortest path.

FIG. 3C shows an example of the third step in the safe corridor generation portion of the methods, finding a set of safe corridors. Using the graph from the previous step and the start and end locations as inputs, this step returns a list of the shortest paths. This involves finding the triangles in the mesh which contain the start and end locations. The start and ending nodes in the abstracted graph will be those representing these triangles. For some integer k, a k-shortest path algorithm is run to determine the k shortest paths. Each path consists of a list of edges, where the nodes in the path determine an ordered list of triangles in the mesh. A safe corridor consists of the area covered by the triangles in the shortest path.

To summarize, the main steps involved in the corridor construction are shown in FIGS. 3A-3C. The figures show the initial position of $AV_1$, S, the start and end of the rendezvous line segment $T_s$ and $T_f$, and the obstacles, which are represented by hatched polygons. The triangulation generated by the Delaunay refinement algorithm are shown in dashed lines in FIG. 3A. The abstract graph $G_t$ is superimposed on the triangles, and it is shown with nodes and lines connecting the nodes in FIG. 3B. A corridor is constructed using the path of shortest length in $S_{paths}$; it is shown as triangles formed by solid lines that are not hatched in FIG. 3C.

Path Optimization

Figure 4:
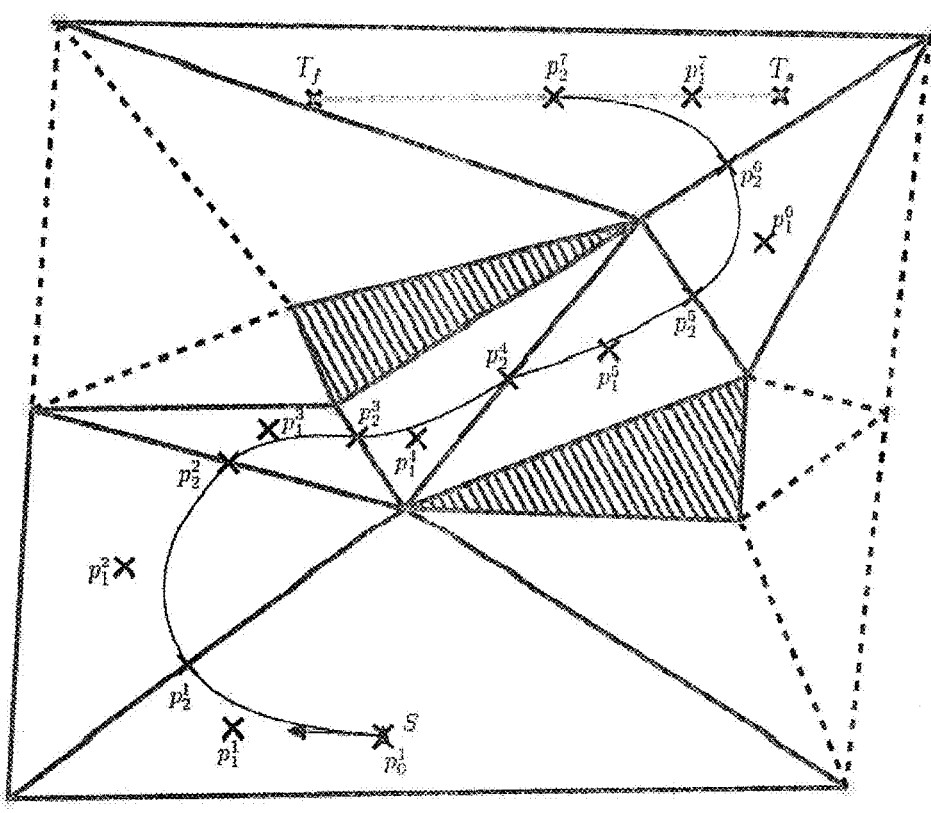
FIG. 4 is a diagram showing a quadratic Bézier curve for each triangle along the corridor and the corresponding control points.

FIG. 4 shows an example of the second main component of the method, path optimization. The path consists of a set of QBCs that are concatenated with $G^1$ continuity. That is, the path is continuous and has a continuous tangent everywhere. The output of the corridor construction is given as a sequence of triangles, and let this be $\Delta = \{\Delta_1, \ldots, \Delta_m\}$, where m is the total number of triangles in the corridor. The path construction involves m QBCs corresponding to the m triangles in $\Delta$. An illustration of this is shown in FIG. 4, where the x's in each triangle are the control points of the QBC. Let the control points of $k^{th}$ QBC be $$p^k := \{p_0^k, p_1^k, p_2^k\},$$

that define the curve as in equation (1). The idea is to define the path using m sets of these control points, $p^k$'s, and formulate the objective and the constraints such that they could be solved using a nonlinear program solver.

The Bézier curve always starts at the first control point and ends at the final control point. Therefore, the first control point of the first Bézier curve, $$p_0^1,$$

should be the starting position of the $AV_1$, $(s_x, s_y)$. The initial heading of $AV_1$ is given as $s_\theta$, and therefore the second control point $$p_1^1$$

should lie along the ray starting from $(s_x, s_y)$ with a heading $s_\theta$. The path needs to end on the line segment $T_s T_f$ with a heading aligned in the direction $T_s \rightarrow T_f$. Because of this, the last control point of the last QBC, $$p_2^m$$

is constrained to lie on the $T_s T_f$, and $$p_1^m$$

is constrained to lie along a ray starting at $$p_2^m$$

with heading $t_\theta + \pi$.

To simplify the formulation of constraints, a change of coordinates that define the control points of the QBCs is used. The path consists of m Bézier curves that are concatenated with $G^1$ continuity. The set $$\{p_1^2, \ldots p_1^{m-1}\}$$

are the mid-control points of the QBCs corresponding to the triangles 2 to m−1. To allow for a rendezvous, let $\delta$ be the variable that defines distance between the final control point on $T_s T_f$ and $T_s$. Let $\alpha_1$ be the variable that defines the distance between first control point and second control point of the first QBC, andlet $\alpha_m$ be the variable that defines distance between $$p_1^m \text{ and } p_2^m.$$

To satisfy the $G^1$ continuity, each knot point between two successive QBCs is constrained to lie on a straight line connecting the mid-control points of two successive QBCs. For example, consider two successive QBCs, indexed j and j+1. For continuity, the last control point of $QBC_j$, $$p_2^j,$$

and the first control point of $QBC_{j+1}$, $$p_0^{j+1}$$

have to be the same, and $$p_2^j \text{ or } p_0^{j+1}$$

should lie on the straight line connecting $$p_1^j \text{ and } p_1^{j+1}.$$

The set of variables $\gamma_j$, j=1 . . . m−1 is defined such that knot points are given as $$p_2^j = (1 - \gamma_j)p_1^j + \gamma_j p_1^{j+1}.$$

The bounds $0 \leq \gamma_j \leq 1$ constrain the knot point $$p_2^j$$

to lie between $$p_1^j \text{ and } p_1^{j+1}.$$

Let x represent the set of all the variables defined above. Note that the $$p_1^i s \qquad 5$$

are Cartesian coordinates of a point, and therefore consists of two variables representing the x and y coordinates. With a slight manipulation of notation, x is defined as the following:

$$x \triangleq \{\alpha_1, \alpha_m, \delta, \gamma_1, \dots \gamma_{m-1}, p_1^2, \dots p_1^{m-1}\} \qquad (4)$$

In the following, the objective of the nonlinear program and the formulations of the constraints that are imposed are defined to generate a feasible path.

Path optimization is performed iteratively over the k safe corridors. The iterations will stop when a feasible path is found or if there are no more corridors left. Below is a description of one iteration.

To begin an iteration: let m be the number of triangles in the corridor under consideration in the current iteration. Each triangle has a QBC associated with it. By definition, a QBC has three control points, thus there are 3m total control points. The first triangle and last triangle are handled differently from triangles 2 through m−1.

First, the constraints are defined. There are four main sets of constraints: a) initial and final configurations; b) length (time of arrival) constraint; c) maximum curvature constraint; and d) smoothness constraints between adjoining QBC.

a) Initial and final configuration constraints: in the first triangle of the corridor, the initial control point of the QBC is defined to be the starting location of the trajectory. The second control point is then constrained to lie on the vector pointing in the direction of the initial heading. In the last triangle (triangle m), the last control point lies at a rendezvous point which is a distance delta from the beginning of the line segment on which the second UAV is traveling. The second to last control point is collinear with the line segment opposite the final heading. The distance from the first to second control point is $\alpha_1$ and the distance from the second to last and last control point is $\alpha_m$.

Initial and Final Configurations: The control point $$p_0^1 \qquad 50$$

is set to the starting position $(s_x, s_y)$, and the definition of the variables $\delta$, $\alpha_1$ and $\alpha_m$ implicitly satisfies the initial and final position and heading constraints.

Continuity: By the definition of the variables, $\gamma_j$'s, the knot points always lie on a straight line connecting the previous and next control points. This implicitly satisfies the $G^1$ continuity.

Obstacle Avoidance: The main premise for the corridor generation as a sequence of triangles is to formulate the obstacle avoidance constraints. The sequence of triangles, $S_{corr}$, does not intersect with any of the obstacles. We define each QBC so that the first and third control points lie on the edges of a triangle and the mid-control point lies inside the triangle. Therefore, due to the convex hull property of the Bézier curves, it is sufficient to constrain the control points of each QBC to the triangles in $S_{corr}$, and the resulting path satisfies the obstacle avoidance constraints. Let $\{u^j, v^j, w^j\}$ be the vertices of triangle j in $S_{corr}$. The mid-control point, $$p_1^j,$$

of the corresponding QBC is constrained to lie inside the triangle $u^j v^j w^j$. Without loss of generality, we assume the vertices $\{u^j, v^j, w^j\}$ are in counter-clockwise sequence, the following set of constraints ensures the mid-control points lie inside the corresponding triangles. The subscripts x and y represent the corresponding coordinates of the points.

$$(p_{1x}^j - u_x^j)(v_y^j - u_y^j) - (p_{1y}^j - u_y^j)(v_x^j - u_x^j) < 0 \qquad (5)$$

$$(p_{1x}^j - v_x^j)(w_y^j - v_y^j) - (p_{1y}^j - v_y^j)(w_x^j - v_x^j) < 0 \qquad (6)$$

$$(p_{1x}^j - v_x^j)(w_y^j - v_y^j) - (p_{1y}^j - v_y^j)(w_x^j - v_x^j) < 0 \qquad (7)$$

$$\forall j = 2, \dots m - 1$$

Let $$p_1^j \text{ and } p_1^{j+1}$$

be the mid-control points of two QBCs corresponding to successive triangles in $S_{corr}$, and let $$v_1^j \text{ and } v_2^j$$

be the vertices of the common edge of the two triangles. The knot point is given as $$p_2^j = (1 - \gamma_j)p_1^j + \gamma_j p_1^{j+1},$$

and it is constrained to lie on the line segment connecting $$v_1^j \text{ and } v_2^j$$

using the following constraints.

$$(v_{2j}^j - v_{1j}^j)(p_{2x}^j - v_{1x}^j) - (v_{2x}^j - v_{1x}^j)(p_{2y}^j - v_{1y}^j) = 0 \qquad (8)$$

$$\min(v_{1x}^j, v_{2x}^j) \le p_{2x}^j \le p_{2x}^j \le \max(v_{1x}^j, v_{2x}^j) \qquad (9)$$

$$\forall j = 1, \dots m - 1$$

b) Length Constraint: The length of one QBC is given in equation (3). The length constraint for the entire trajectory is that the sum of the lengths for all QBC must equal the sum of the delta and $v_t^* t_x$. This represents the distance traveled by the intercept point; since the pursuer is traveling the same speed, this is also the distance that the pursuer must travel.

c) Maximum Curvature Constraints: The maximum curvature of one QBC is given in equation (2). Thus, every QBC comprising the trajectory must individually satisfy the curvature constraint.

Maximum Curvature: The maximum curvature of QBC$_j$, $$\kappa_{max}(p_0^j, p_1^j, p_2^j),$$

is given in equation (2), and the following set of constraints ensures the curvature constraints are satisfied everywhere along the path, $$\kappa_{max}(p_0^j, p_1^j, p_2^j) \leq \kappa_{limit, \forall j=1,\ldots m} \qquad (10)$$

d) Smoothness Constraint (see FIG. 4): There are 3m control points; three for each of the m QBC in the trajectory. The first two control points of the first QBC and the last two control points of the last QBC are defined by the initial and final configuration constraints. Take all triangles along the corridor except for the first and last (2, . . . , m−1). The mid-control point for each of these QBCs (2, . . . , m−1) is constrained to strictly lie inside its respective triangle. For continuity, the first control point of each of these is the same as the last control point of the previous triangle. To ensure the path avoids the obstacle, these control points must lie on the line segment that is the boundary of the two neighboring triangles and they must be collinear with the mid-control points of these neighboring triangles.

The objective function for the path optimization block in FIG. 6 is to minimize the path length subject to the above constraints.

If the optimization returns a feasible path, then stop. If the optimization does not return a feasible path and there exist other shortest corridors in the list, start a new iteration to perform the optimization using the next shortest corridor. If there are no other corridors to investigate, then the algorithm indicates that no trajectory was found.

The methods described herein can provide a number of advantages. It should be understood, however, that these advantages need not be required unless they are set forth in the appended claims.

The methods of aerial vehicle trajectory planning are capable of calculating the length of the path taken by the aerial vehicle, as well as the time of arrival. The method is capable of calculating length during the computation of the trajectory, rather than after computing the trajectory. The aerial vehicle can arrive in minimum time by optimizing the length of the trajectory. The methods of planning the trajectory of aerial vehicles can be used in an area that contains obstacles, and can account for such obstacles. The methods are capable of planning trajectories for not only aircraft that can hover, but also for fixed wing aircraft. The methods are computationally simple enough and fast enough to provide on-board real-time computation for an aerial vehicle. The methods may be useful in numerous situations including, but not limited to: for aerial refueling; for aerial package delivery; and for air taxis in urban settings. Such situations require trajectory plans which avoid obstacles and no-fly zones and ensure that the aerial vehicle arrives at the destination on time.

EXAMPLES

The following examples illustrate particular properties and advantages of some of the embodiments of the present invention. Furthermore, these are examples of reduction to practice of the present invention and confirmation that the principles described in the present invention are therefore valid but should not be construed as in any way limiting the scope of the invention.

Simulation Results

The trajectories generated for a scenario with five obstacles and four different arrival times, t$_s$, of AV$_2$ at T$_s$ are shown in FIG. 5A-FIG. 5D. The initial position, S, of AV$_1$ is (4000,−2000) where the numbers represent coordinates without units in artificially created simulations (and could be meters), and the initial heading direction is 2.6 radians with respect to x-axis. The ends of the rendezvous line segment T$_s$ and T$_f$ are set as (5000,7000) and (−2000,5000). The maximum curvature limit of the path is set to be 0.002, which corresponds to a minimum turn radius of 500. The values of t$_s$ corresponding to the four scenarios are 6000, 10000, 20000 and 25000 respectively. The trajectories computed reflect the increasing values of t$_s$, where the algorithm finds a longer flight corridor for higher t$_s$. In the second scenario shown in FIG. 5B, t$_s$ is sufficiently high and the rendezvous occurs at the starting point T$_s$. This is as expected as the algorithm aims for a rendezvous as early as possible and hence returns a path to the starting position of the rendezvous line segment. In the third and fourth scenarios, the values of t$_s$ are even larger, and the algorithm finds the feasible trajectory using a longer flight corridor to satisfy the rendezvous constraints.

The algorithm is also run for hundreds of instances where the positions of the obstacles and the domain end points are as shown in FIG. 5A-FIG. 5D. For each instance, the initial position and heading of the AV$_i$ are generated randomly from a uniform distribution. The values of t$_s$ are also generated randomly in the interval [l$_{min}$,l$_{min}$+5000], where l$_{min}$ is the shortest feasible path from initial configuration to any point on T$_s$T$_f$ without rendezvous constraints. Two different triangulation algorithms are used to generate the flight corridors. The first one is where the triangles produced are forced to satisfy the Delaunay property. In the second one a Constrained Delaunay Triangulation (CDT) is used where the triangles are restricted to have a minimum internal angle of 10 degrees. The computational results with these two triangulations are shown in Table I. The CDT performed better with respect to the percentage of successful instances, mean cost of the objective and mean computation times. The nonlinear program could not find a solution for some instances. Due to the random generation of the instances, it is possible that those instances may not have any feasible solution. The computation times reported are sufficiently fast for online trajectory generation.

TABLE I

| AVERAGE COMPUTATION TIMES AND COST FOR 100 INSTANCES | | | |
|---|---|---|---|
| Triangulation | Percent Success | Mean cost | Mean Comp. time |
| Delaunay | 78% | 12538 | 1.52 (secs) |
| CDT | 84% | 11506 | 1.02 (secs) |

Flight Test

A flight test is conducted using a Martin UAV Bat-4, a fixed-wing single engine pusher UAV obtained from Martin UAV, Texas. The UAV is equipped with a Piccolo Autopilot and a NVIDIA Jetson TX2, which is running a copy of Unmanned Systems Autonomy Services (UxAS) developed by the Air Force Research Laboratory, Aerospace System Directorate, Power and Control Division. UxAS is an extendable set of modular services aimed toward coopera-
tive UAV mission management to handle the following
high-level capabilities of small unmanned aircraft systems
(sUAS): task planning, task assignment, task execution, path
planning, and sensor management.

For this flight test, the system functionality can be
described as follows. Initially, the aircraft is commanded to
loiter to the southwest of the start location. The planner
described herein initiates the plan based on a pre-defined
start location. This path is discretized into straight line
segments and sent to UxAS to follow. UxAS uses the air
vehicle state information that is broadcast from the autopilot
to compute heading commands to follow the path. Despite
the discretization of the trajectory that was generated by the
algorithm, the path following error for such paths is insig-
nificant.

The flight test takes place at Camp Atterbury Indiana, and
the scenario is depicted in FIGS. 7A and 7B. The figures
depict a local tangent plane with units of meters above Camp
Atterbury. The obstacles are shown by the triangles and the
path for the (synthetic) $AV_2$ is a straight line that runs from
the left to the right at the top of the figures. The path to
following is the discretized path computed using the same
algorithm and code as described above and the actual path
is the telemetry of the UAV. For this initial test, the start
location for the planning is not computed based on the
position of $AV_1$; instead, $AV_1$ is commanded to loiter south-
west of the start location. For this reason, the actual path
progresses to the path to follow, and the two paths overlap
between the hatch marks. The flight test verifies that the
algorithm is light-enough to be able to run on an on-board
ARM processor.

The disclosure of all patents, patent applications (and any
patents which issue thereon, as well as any corresponding
published foreign patent applications), and publications
mentioned throughout this description are hereby incorpo-
rated by reference herein. It is expressly not admitted,
however, that any of the documents incorporated by refer-
ence herein teach or disclose the present invention.

While the present invention has been illustrated by a
description of one or more embodiments thereof and while
these embodiments have been described in considerable
detail, they are not intended to restrict or in any way limit the
scope of the appended claims to such detail. Additional
advantages and modifications will readily appear to those
skilled in the art. The invention in its broader aspects is
therefore not limited to the specific details, representative
apparatus and method, and illustrative examples shown and
described. Accordingly, departures may be made from such
details without departing from the scope of the general
inventive concept.

What is claimed is:

1. A method of planning a trajectory for an aerial vehicle
in an area and following the trajectory from a start location
to an end location, which area has one or more obstacles
therein, wherein said aerial vehicle has a minimum turn
radius, said method comprising the steps of:
  a) generating a safe corridor to account for obstacles in the
  area in which the aerial vehicle will be traveling, said
  step of generating a safe corridor comprising represent-
  ing the flight corridor as a series of triangles, said
  triangles having three edges, wherein obstacles are
  defined as holes in the area between said triangles;
  b) defining a quadratic Bézier curve (QBC) corresponding
  to each triangle in the flight corridor, wherein each
  quadratic Bézier curve has a pair of ends and a plurality
  of control points, wherein said control points include an initial control point and a terminal control point, and
bounding each quadratic Bézier curve to lie within the
corresponding triangle, wherein said quadratic Bézier
curves include an initial Bézier curve and a final Bézier
curve, wherein said initial control point and said ter-
minal control point of the Bézier curves other than the
initial control point of the initial Bézier curve and the
terminal control point of the final Bézier curve are
constrained to lie on the triangle edges, and wherein the
radius of curvature along all portions of said quadratic
Bézier curves is greater than or equal to the minimum
turn radius of the aerial vehicle;
  c) constraining the terminal control point on the final
  Bézier curve to align with the end location;
  d) aligning said quadratic Bézier curves end-to-end to
  form a trajectory comprising a path having a length,
  wherein the tangent to the path is continuous along the
  length of the path;
  e) utilizing a nonlinear program to simultaneously solve
  for the control points of all of the quadratic Bézier
  curves to generate a trajectory for said aerial vehicle;
  and
  f) controlling said aerial vehicle from said start location to
  said end location along said trajectory generated in
  steps a)-e).

2. The method of claim 1 wherein the method is used by
said aerial vehicle to plan a trajectory among obstacles that
determines a time of arrival to a destination.

3. The method of claim 1 wherein steps a) to e) and the
trajectory are all computed onboard an aerial vehicle while
the aerial vehicle is in flight.

4. The method of claim 1 wherein the method is used to
plan and follow a trajectory for minimum time rendezvous
with a moving aerial object.

5. An aerial vehicle comprising:
  a body;
  a propulsion system joined to said body;
  an on-board computing device inside said body for plan-
  ning the trajectory of the aerial vehicle, wherein said
  on-board computing device plans a trajectory for said
  aerial vehicle, wherein said computing device is con-
  figured to:
  generate a safe corridor to account for obstacles in the
  area in which the aerial vehicle will be traveling by
  representing the flight corridor as a series of tri-
  angles, said triangles having three edges, wherein
  obstacles are defined as holes in the area between
  said triangles;
  define a quadratic Bézier curve corresponding to each
  triangle in the flight corridor, wherein each quadratic
  Bézier curve has a pair of ends and three control
  points, wherein said control points include an initial
  control point and a terminal control point, wherein
  said quadratic Bézier curves include an initial Bézier
  curve and a final Bézier curve, wherein said initial
  control point and said terminal control point of the
  Bézier curves other than the initial control point of
  the initial Bézier curve and the terminal control point
  of the final Bézier curve are constrained to lie on the
  triangle edges;
  align said quadratic Bézier curves end-to-end to form a
  trajectory comprising a path having a length wherein
  the tangent to the path is continuous along the length
  of the path;
  utilize a nonlinear program to simultaneously solve for
  the control points of all of the quadratic Bézier
  curves; and control the aerial vehicle to follow the trajectory to a destination.

6. The aerial vehicle of claim 5 comprising a pair of fixed wings joined to said body.

7. An unmanned aerial vehicle according to claim 5.

8. The method of claim 1 wherein there is a closed form solution for the maximum curvature and the length of the QBCs.

9. The method of claim 8 wherein the closed form solution of the maximum curvature $K_{max}$, of a QBC as a function of the control points depends on the position of $p_1$ as shown below:

$$\kappa_{max} = \begin{cases} \dfrac{\|p_1 m\|^3}{A_t^2}, & \text{if } p_1 \notin C_1 \cup C_2, \\[2ex] \dfrac{A_t}{\|p_0 p_1\|^3}, & \text{if } p_1 \in C_1, \\[2ex] \dfrac{A_t}{\|p_1 p_2\|^3}, & \text{if } p_1 \in C_2. \end{cases}$$

where $p_0, p_1, p_2$ are the control points of a QBC, $P(\tau)$; the mid-point of the line joining $p_0$ and $p_2$ is represented by m;

$A_t$ is the area of the triangle $\Delta p_0, p_1, p_2$; $C_1$ and $C_2$ are circles with diameters $p_0 m$ and $p_2 m$ respectively; and, the symbol $\notin$ indicates no set membership and reads "is not an element or member of" or "does not belong to".

10. The method of claim 8 wherein the length of a QBC can be expressed as an analytical function of its control points, and is given below:

$$L_b = \frac{1}{8A^{\frac{3}{2}}}\left[ 4A^{\frac{3}{2}}W + 2\sqrt{A}\,B(W - \sqrt{C}) + (4CA - B^2)\log\left| \frac{2\sqrt{A} + \dfrac{B}{\sqrt{A}} + 2W}{\dfrac{B}{\sqrt{A}} + 2\sqrt{C}} \right| \right]$$

where $W = \sqrt{A + B + C}$, $A = 4(a_x^2 + a_y^2)$, $B = 4(a_x b_x + a_y b_y)$, $C = b_x^2 + b_y^2$, and $a = p_0 - 2p_1 + p_2$, $b = 2p_1 - 2p_0$, where $p_0$, $p_1$, and $p_2$ are the control points of a QBC, and a and b are functions of the control point coordinates, wherein $a_x$, $a_y$, $b_x$, and $b_y$ are the x-coordinate and y-coordinate values of a and b, respectively.

* * * * *